United States Patent
Kirchhoefer et al.

(10) Patent No.: US 12,415,499 B2
(45) Date of Patent: Sep. 16, 2025

(54) METHOD AND DEVICE FOR OPERATING A VEHICLE

(71) Applicant: Robert Bosch GmbH, Stuttgart (DE)

(72) Inventors: Konrad Kirchhoefer, Benningen am Neckar (DE); Markus Beisswenger, Schwaebisch Hall (DE); Fabian Schnelle, Tamm (DE)

(73) Assignee: Robert Bosch GmbH, Stuttgart (DE)

( * ) Notice: Subject to any disclaimer, the term of this patent is extended or adjusted under 35 U.S.C. 154(b) by 142 days.

(21) Appl. No.: 18/548,313

(22) PCT Filed: Dec. 14, 2021

(86) PCT No.: PCT/EP2021/085599
§ 371 (c)(1),
(2) Date: Aug. 29, 2023

(87) PCT Pub. No.: WO2022/189023
PCT Pub. Date: Sep. 15, 2022

(65) Prior Publication Data
US 2024/0132043 A1   Apr. 25, 2024
US 2024/0227768 A9   Jul. 11, 2024

(30) Foreign Application Priority Data

Mar. 9, 2021   (DE) ............... 10 2021 202 276.6

(51) Int. Cl.
*B60W 10/20*   (2006.01)
*B60W 50/00*   (2006.01)

(52) U.S. Cl.
CPC ........ *B60W 10/20* (2013.01); *B60W 50/0098* (2013.01); *B60W 2050/0031* (2013.01);
(Continued)

(58) Field of Classification Search
CPC ......... B60W 10/20; B60W 2050/0012; B60W 2050/0031; B60W 2050/0054;
(Continued)

(56) References Cited

U.S. PATENT DOCUMENTS 4,862,368 A * 8/1989 Kost ................... B60T 8/17636
                                                     701/70
6,098,007 A * 8/2000 Fritz ...................... B60T 8/175
                                                     701/93
(Continued)

FOREIGN PATENT DOCUMENTS

DE   10 2009 056 674 A1   6/2011
DE   10 2011 121 454 A1   6/2013
(Continued)

OTHER PUBLICATIONS

250326 EP2832599A1—Koenig et al—Google Patents (Year: 2014).*
(Continued)

*Primary Examiner* — Carl C Staubach
(74) *Attorney, Agent, or Firm* — Maginot, Moore & Beck LLP

(57) ABSTRACT

A method is for operating a vehicle which has actuators for influencing a driving behavior of the vehicle. The method includes sensing a setpoint for the driving behavior, in particular a steering angle set by a driver, and depending on the setpoint for the driving behavior, a first pilot control variable is determined using a model for the vehicle. Depending on the first pilot control variable, a second pilot control variable is determined using at least two partial models for the driving behavior of the vehicle, which differ due to the use of at least one of the actuators. Depending on the first pilot control variable and depending on the second
(Continued)

pilot variable, a first setpoint for a first actuator is determined. The first setpoint is output in order to actuate the first actuator.

11 Claims, 4 Drawing Sheets

(52) U.S. Cl.
CPC . *B60W 2050/0083* (2013.01); *B60W 2520/20* (2013.01); *B60W 2540/18* (2013.01)

(58) Field of Classification Search
CPC ..... B60W 2050/0083; B60W 2520/20; B60W 2540/18; B60W 2710/18; B60W 2710/20; B60W 2710/205; B60W 2720/14; B60W 30/02; B60W 50/0098
See application file for complete search history.

(56) References Cited

U.S. PATENT DOCUMENTS

| | | | | |
|---|---|---|---|---|
| 7,529,605 | B2* | 5/2009 | Sugitani | B62D 6/008 |
| | | | | 180/443 |
| 10,597,028 | B2* | 3/2020 | Kasaiezadeh Mahabadi | |
| | | | | B60W 10/04 |
| 11,654,965 | B2* | 5/2023 | Mayer | B62D 15/0285 |
| | | | | 701/42 |
| 11,891,059 | B2* | 2/2024 | Kim | B60W 10/18 |
| 2018/0017971 | A1* | 1/2018 | Di Cairano | B62D 15/0265 |
| 2019/0256064 | A1* | 8/2019 | Hecker | B60T 8/88 |
| 2019/0322313 | A1* | 10/2019 | Münch | B60W 60/00 |
| 2022/0041176 | A1* | 2/2022 | Balachandran | B60W 50/087 |
| 2023/0123469 | A1* | 4/2023 | Di Cairano | B60W 10/08 |
| | | | | 701/70 |
| 2024/0046798 | A1* | 2/2024 | Oara | G05D 1/0293 |

FOREIGN PATENT DOCUMENTS

| | | |
|---|---|---|
| DE | 10 2014 214 272 A1 | 1/2016 |
| DE | 10 2017 207 536 A1 | 11/2018 |
| EP | 2 832 599 A1 | 2/2015 |

OTHER PUBLICATIONS

International Search Report corresponding to PCT Application No. PCT/EP2021/085599, mailed Apr. 20, 2022 (German and English language document) (5 pages).

* cited by examiner

METHOD AND DEVICE FOR OPERATING A VEHICLE

This application is a 35 U.S.C. § 371 National Stage Application of PCT/EP2021/085599, filed on Dec. 14, 2021, which claims the benefit of priority to Serial No. DE 10 2021 202 276.6, filed on Mar. 9, 2021 in Germany, the disclosures of which are incorporated herein by reference in their entirety.

BACKGROUND

The disclosure relates to a method and device for operating a vehicle which has at least two actuators for influencing a driving behavior of the vehicle upon demand.

EP 2 832 599 A1 discloses a method in which multiple actuators are actuated depending on only one target driving behavior of the vehicle.

SUMMARY

Compared to the known method, the method according to the disclosure has the advantage that actuators can be integrated into a driving dynamics control means for influencing a driving behavior of a vehicle in order to achieve a major gain in safety.

Driving dynamics control, in particular of a steering actuator, e.g., on the front axle, the rear axle, or both also leads in particular to a reduction in the load on the steering actuator, since operating ranges that are not useful in terms of driving dynamics are prevented by the type of actuation, e.g., with respect to an amplitude or a gradient. In particular, steer-by-wire systems can have a smaller design in combination with the actuation.

Combining steering and brake control from a uniform driving dynamics model brings further advantages. Given combined control, maximum performance can be achieved using the individual actuator characteristics.

Optimal use of the steering actuator relieves an ESP actuator, e.g. a brake, since only a weakness specific to the steering actuator need be compensated for by the brake.

Said actuation results in significantly less tire wear in understeering situations due to full utilization of the front axle side force, while improving comfort and maximizing gains in safety.

The method for operating the vehicle provides that a setpoint for the driving behavior, in particular a steering angle set by a driver, is sensed; depending on the setpoint for the driving behavior, a first pilot control variable is determined using a first model for the vehicle; depending on the first pilot control variable, a second pilot control variable is determined using at least two partial models for the driving behavior of the vehicle, which differ due to the use of at least one of the actuators; depending on the first pilot control variable and depending on the on the second pilot control variable, a first setpoint for a first actuator is determined, and the first setpoint is output in order to actuate the first actuator.

In one aspect, the setpoint for the actuator is determined depending on a sum of the first pilot control variable and the second pilot control variable, in particular depending on a difference between the sum and the setpoint for the driving behavior.

In one aspect, the first model maps the setpoint for the driving behavior to the first pilot control variable.

Preferably, at least one limit for a range is determined depending on an operating variable of the vehicle that characterizes the vehicle behavior, whereby the setpoint for the driving behavior is mapped to the range. The range defines values for the first pilot control variable that are useful for a desired vehicle behavior.

The first model can also limit a change of the first pilot control variable. Changes to the first pilot control variable that may lead to unfavorable vehicle behavior are thereby avoided.

In one aspect, a slip angle is determined on an axis of the vehicle, whereby the first model limits the change depending on the slip angle. First pilot control variables are therefore determined depending on the situation, said variables being particularly well-suited to stable driving behavior.

In one aspect, the setpoint for the driving behavior is determined depending on a steering angle set by a driver.

The method can provide that, using at least two partial models for the driving behavior of the vehicle, which differ due to the use of at least one of the actuators, a third pilot control variable is determined for a second actuator, the third pilot control variable being output in order to actuate the second actuator. This cascade-like pilot control action eliminates the need for an optimizer to coordinate the two actuators. For example, a steering actuator is actuated as a first actuator, and a brake is actuated as a second actuator in order to adjust a yaw response of the vehicle depending on a steering angle set by the driver.

Preferably, a second setpoint, in particular a set yaw rate, for influencing the driving behavior is determined depending on the second pilot control variable and depending on the third pilot control variable.

In one aspect, it is provided that the first actuator steers at least one wheel of a front axle depending on the first setpoint, or that the first actuator steers at least one wheel of a rear axle depending on the first setpoint.

A device for influencing the driving behavior of the vehicle is designed to perform the method.

BRIEF DESCRIPTION OF THE DRAWINGS

Further advantageous embodiments follow from the description hereinafter and from the drawings. The drawings include.

DETAILED DESCRIPTION

A model-based pilot control action, which is limited to systems exhibiting input affinity and used for influencing a driving behavior of a vehicle, causes an actuator to be controlled in order to intervene linearly in terms of dynamic behavior.

This results in limitations in the use of steering actuators because they have a non-linear effect on the system. As a result, the use of active steering actuators in driving dynamic control systems is generally made more difficult, as they cannot then be operated in the range necessary for driving dynamics control.

Figure 1:
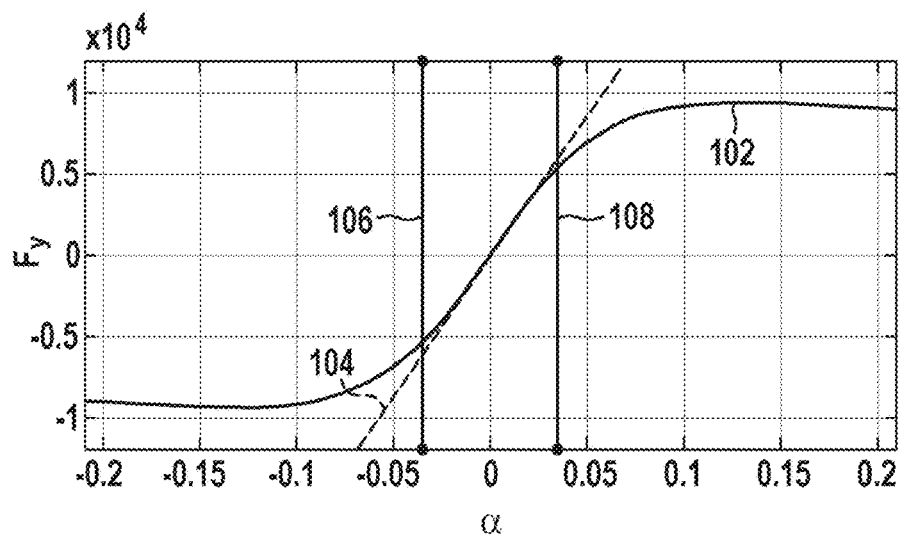
FIG. 1 limits when using steering angle actuators,
FIG. 2 an actuator-specific difference,
FIG. 3 a lateral force progression for a front axis over a slip angle at the front axis,
FIG. 4 an example of a pilot control cascade,
FIG. 5 an example of an integration of the pilot control cascade into a control system.

The limits that arise when using steering actuators are shown in FIG. 1. In FIG. 1, a curve 102 is shown showing a progression of a lateral force $F_y$ over a slip angle $\alpha$ for a non-linear approach. In FIG. 1, a straight line 104 is shown showing a progression of a lateral force $F_y$ over the slip angle $\propto$ for a linear approach. The curve 102 depicts or very well approximates a real progression occurring on the vehicle. The straight line 104 approaches the non-linear progression of the curve 102 between a lower limit 106 and an upper limit 108 for the slip angle $\propto$ at a greater accuracy than outside of these limits.

By restricting the model-based pilot control action to linear input variables, a driving dynamics effective range is limited to a small range between the lower limit 106 and the upper limit 108 for the slip angle $\propto$. A large part of the potential for using a steering angle actuator in driving dynamics control remains unused in this case.

The disclosure extends model-based pilot control action to affine systems in a general form, thereby enabling integrated driving dynamics control of various actuators acting on the driving dynamics, including actuators acting non-linearly on the driving dynamics. For a steering actuator, e.g., integrated driving dynamics control over an entire slip angle range which may occur in critical driving dynamics situations is enabled.

Figure 2:
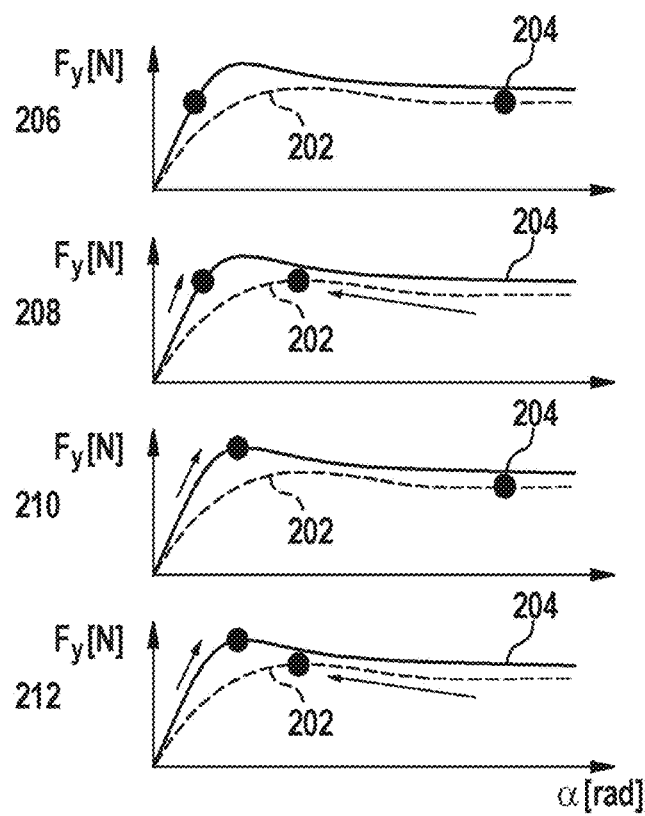

An actuator-specific difference thereby is clarified in the illustration shown in FIG. 2. FIG. 2 shows an understeer situation, with the steering being oversteered by the driver. FIG. 2 shows a first progression 202 of the lateral force $F_y$ over the slip angle $\propto$ for a front axle and a second progression 204 of the lateral force $F_y$ over the slip angle $\propto$ for a rear axle in the following situations:

without active driving dynamics engagement 206
steer-by-wire engagement 208
brake engagement 210
combined engagement of steer-by-wire and brake engagement 212.

During a period without active driving dynamics engagements 206, the power utilization on both axles is not optimal, and one axle at a time can be guided to the maximum force, either by using steer-by-wire engagement 208 or by using brake engagement 210. On the other hand, the combined engagement of steer-by-wire and brake engagement 212 provides better, in particular optimal, utilization on one or both axles.

Actuation of the two steering and brake actuators of a vehicle by a pilot control action is described hereinafter regarding the brake and a front axle steering actuator of the vehicle. The brake in this example provides a first contribution $u_1$. The front axle steering actuator in this example provides a second contribution $u_2$. A change in a yaw rate $\dot{\Psi}$ of the vehicle can be represented using a state vector x, and a steering angle $\delta$ in a model for the pilot control action can be represented as $$\dot{\Psi} = f_1(x,\delta) + g_1(x)u_1 + g_2(x,\delta+u_2)$$

The state vector x describes a state of the vehicle. The state vector x is, e.g., defined by the states of the side slip angle and yaw rate of the vehicle.

The steering angle $\delta$ is determined in this model depending on a steering angle $\delta_{FA}$ set by a driver of the vehicle. The steering angle $\delta_{FA}$ set by the driver of the vehicle represents a setpoint for a driving behavior of the vehicle. The steering angle $\delta$ is in this case determined by a model-based limitation of the steering angle $\delta_{FA}$ set by the driver, as described hereinafter.

In the example, the steering angle $\delta_{FA}$ set by the driver is limited such that a slip angle $\propto_{FA}$ at the front axle remains within a stable range of the lateral force characteristic.

Figure 3:
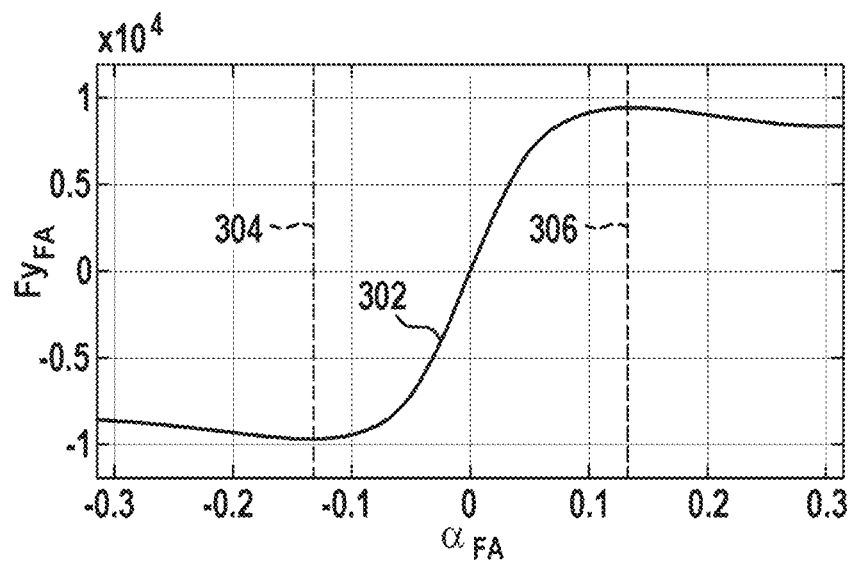

FIG. 3 shows an example of the range in a progression 302 of a lateral force $Fy_{FA}$ for the front axis over a slip angle $\propto_{FA}$ for the front axle between a first limit 304, e.g. a minimum slip angle $-\propto_{max}$, and a second limit 306, e.g. a maximum slip angle $\propto_{max}$. The range is defined, e.g., by $|\propto_{FA}| \leq \propto_{max}$.

In this example, a change in the steering angle 4A specified by the driver is limited such that the steering angle dynamics specified by the driver remain within a range useful to the vehicle in terms of driving dynamics. The range feasible by the vehicle in critical situations in reference to the existing frictional value is considered to be advantageous in terms of driving dynamics.

The change $\dot{\delta}_{FA}$ is, e.g., limited to a maximum allowed change $\dot{\delta}_{max}$, i.e., $|\dot{\delta}_{FA}| \leq \dot{\delta}_{max}$.

After applying these limitations, the model maps the steering angle $\delta$, depending on these states, to a first component for changing the yaw rate $\dot{\Psi}$ by means of a first function $f_1(x, \delta)$.

The model comprises a second component for changing the yaw rate $\dot{\Psi}$.

In order to determine the second component for changing the yaw rate $\dot{\Psi}$, the first contribution $u_1$ is, e.g., multiplied by a factor $g_1(x)$. In order to determine the factor $g_1(x)$, the state vector x is, e.g., mapped to the first factor by means of a second function $g_1(x)$.

The model maps the state vector x, the second contribution $u_2$, and the steering angle $\delta$ to a third component for changing the yaw rate $\dot{\Psi}$ by means of a second function $g_2(x, \delta+u_2)$.

The model-based limited steering angle $\delta$ is used as the input variable for the model. Given that this limitation of the slip angle $\propto_{FA}$ at the front axle lies within the stable range of the lateral force characteristic, an inversion of the lateral force characteristic is possible.

A pilot control variable $u_{2,FF}$ for the front axle steering actuator is thus determined as follows:

$$u_{2,FF} = g_2^{-1}(x,\delta+u_2)[f_1(x,\delta) - f_2(x,\delta)]$$

where $$\dot{\Psi}_1 = f_1(x,\delta) + g_1(x)u_1 + g_2(x,\delta+u_{2,FF})$$

$$\dot{\Psi}_2 = f_2(x,\delta) + g_1(x)u_1$$

and given the condition:

$$\dot{\Psi}_1 = \dot{\Psi}_2$$

A pilot control action over the entire slip angle range is then possible, thus enabling the use of front axle steering actuators.

A superposition angle to the driver $\Delta\delta$ for the front axle is, e.g., calculated as:

$$\Delta\delta = \delta_{FA} - (\delta + u_{2,FF})$$

The same can be performed for a rear axle steering actuator. No limitation in the model is required insofar as the condition $|\propto_{RA}| \leq \propto_{max}$ regarding vehicle stability with respect to the slip angle $\propto_{RA}$ for an operating range at the rear axle is already satisfied based on the requirements of a driving dynamics control system operating in parallel.

Figure 4:
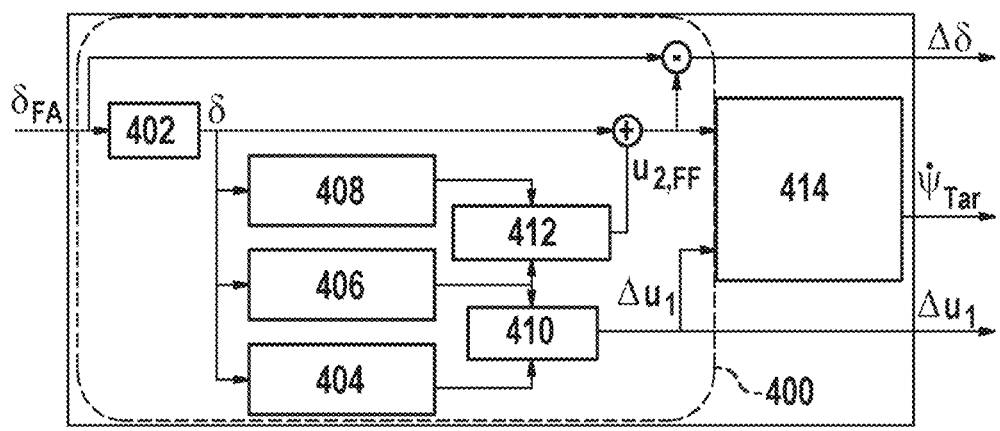

One example of a pilot control cascade 400 is shown in FIG. 4. The pilot control cascade 400 comprises a model 402 designed to determine the steering angle $\delta$ limitation depending on the steering angle set by the driver $\delta_{FA}$. The model 402 can be designed to limit the change $\dot{\delta}_{FA}$ to the maximum allowed change $\dot{\delta}_{max}$.

The pilot control cascade 400 comprises a first partial model 404 designed to determine the first component for changing the yaw rate $\ddot{\Psi}$.

The pilot control cascade 400 comprises a second partial model 406 designed to determine the second component for changing the yaw rate $\ddot{\Psi}$.

The pilot control cascade 400 comprises a third partial model 408 designed to determine the third component for changing the yaw rate $\ddot{\Psi}$.

The pilot control cascade 400 comprises a first device 410 designed to determine a pilot control variable $\Delta u_1$ for actuating the brake.

The pilot control cascade 400 comprises a second device 412 designed to determine the pilot control variable $u_{2,FF}$.

The pilot control cascade 400 is, e.g., supplemented by a vehicle model 414 designed to determine the superposition angle to the driver $\Delta\delta$ and a setpoint for a yaw rate $\dot{\Psi}_{Tar}$, depending on the pilot control variable $u_{2,FF}$ and the pilot control variable $\Delta u_1$.

Figure 5:
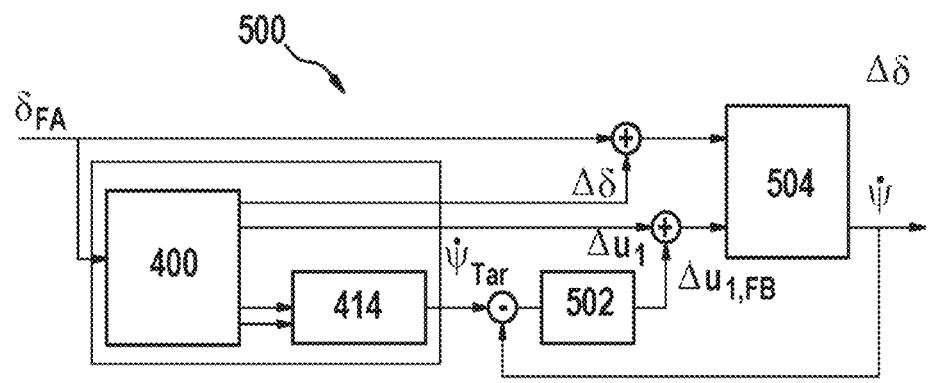

FIG. 5 shows an example of an integration of the pilot control cascade 400 and the vehicle model 414 into a control system 500.

Based on the steering angle $\delta_{FA}$ set by the driver, as described for the pilot control cascade 400 and the vehicle model 414, the setpoint for the yaw rate $\dot{\Psi}_{Tar}$, the pilot control variable $\Delta u_1$ for actuating the brake, and the superposition angle to the driver $\Delta\delta$ are determined.

Using an optional controller 502 for a vehicle 504, a control deviation is regulated, which is determined depending on the setpoint for the yaw rate $\dot{\Psi}_{Tar}$ and a yaw rate occurring in the vehicle $\dot{\Psi}$. A difference between, e.g., the setpoint for the yaw rate $\dot{\Psi}_{Tar}$ and the yaw rate occurring on the vehicle $\dot{\Psi}$ is determined. An output $\Delta u_{1,FB}$ of the controller is referenced using the pilot control variable $\Delta u_1$ in order to actuate the brake of the vehicle 504. A sum from the output $\Delta u_{1,FB}$ from the controller is, e.g., formed using the pilot control variable $\Delta u_1$, and the brake is thereby actuated.

Figure 6:
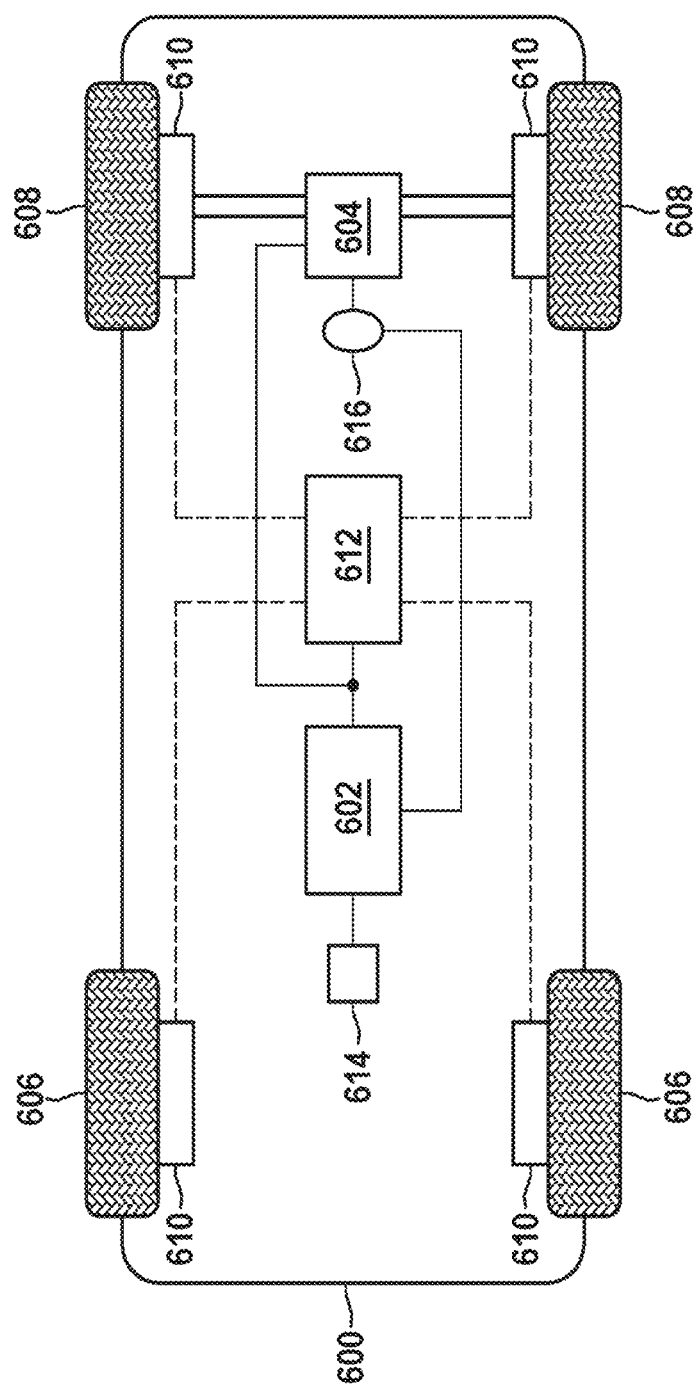
FIG. 6 a schematic illustration of a vehicle.

FIG. 6 shows a schematic illustration of a vehicle 600 comprising a device 602 for influencing the driving behavior of the vehicle 600 according to the method described. The device 602 comprises, e.g., one computing device or multiple computing devices. The device 602 comprises, e.g., the control system 500, or at least a portion thereof.

The vehicle 600 comprises at least one steering actuator 604. The steering actuator 604 is, e.g., the front axle steering actuator. The steering actuator 604 represents, e.g., a first actuator that can be used to influence the driving behavior of the vehicle 600 as described.

The vehicle 600 in the example comprises two rear wheels 606 and two front wheels 608. The rear wheels 606 in the example are not steerable. The front wheels 608 in the example are steerable by means of the steering actuator 604, as described. The first actuator in the example is designed to steer at least one wheel of the front axle, depending on the superposition angle to the driver $\Delta\delta$ for the front axle.

In addition to the front wheels 608, or instead of the front wheels 608, the rear wheels 606 can also be steerable by means of the rear axle steering actuator.

The vehicle 600 also comprises a brake device 610 on each of the wheels. These brakes can be actuated via the brake (shown schematically in FIG. 6 and designated 612, as described). The brake 612 in the example comprises brake lines, indicated as dashed lines for the respective brake devices 610. In the example, the brake 612 represents a second actuator that can be used to influence the driving behavior of the vehicle 600, as described. In the example, the sum from the output $\Delta u_{1,FB}$ from the controller is formed using the pilot control variable $\Delta u_1$, and the brake 612 is thereby actuated.

In the example, the steering actuator 604 and the brake 612 are connected to the device 602 via data lines (shown with a solid line).

In the example, the vehicle 600 comprises a yaw rate sensor 614 designed to sense the yaw rate $\dot{\Psi}$ of the vehicle 600. At least one other sensor can also be provided, using which a variable can be determined, based on which the yaw rate $\dot{\Psi}$ of the vehicle 600 can be calculated via a model.

The vehicle 600 comprises at least one steering angle sensor 616 designed to sense the steering angle $\delta_{FA}$ set by the driver of the vehicle 600.

In the example, these sensors are connected to the device 602 via data lines (shown with a solid line).

The data lines can be designed as part of a controller area network (CAN) bus system.

The invention claimed is:

1. A method for operating a vehicle which has actuators for influencing a driving behavior of the vehicle, the method comprising:
    sensing a setpoint for the driving behavior;
    determining, based on the sensed setpoint for the driving behavior, a first pilot control variable using a model for the vehicle;
    determining, based on the determined first pilot control variable, a second pilot control variable using at least two partial models for the driving behavior of the vehicle, the at least two partial models differ from each other due to a use of at least one of the actuators of the vehicle;
    determining, based on a difference between (i) a sum of the determined first pilot control variable and the determined second pilot variable and (ii) the sensed setpoint for the driving behavior, a first setpoint for a first actuator of the actuators of the vehicle; and
    outputting the determined first setpoint to actuate the first actuator.

2. The method according to claim 1, wherein the model for the vehicle maps the setpoint for the driving behavior to the first pilot control variable.

3. The method according to claim 2, wherein:
    at least one limit for a range is determined based on an operating variable of the vehicle corresponding to the driving behavior, and
    the setpoint for the driving behavior is mapped to the range.

4. The method according to claim 2, wherein the model for the vehicle limits a change of the first pilot control variable.

5. The method according to claim 4, further comprising:
    determining a slip angle on an axis of the vehicle,
    wherein the model for the vehicle limits the change of the first pilot control variable based on the slip angle.

6. The method according to claim 1, wherein the setpoint for the driving behavior is determined based on a steering angle set by a driver.

7. The method according to claim 1, further comprising:
    determining, using at least two partial models for the driving behavior of the vehicle, the at least two partial models differ from each other by a use of at least one of the actuators, a third pilot control variable for a second actuator of the actuators of the vehicle; and
    outputting the third pilot control variable in order to actuate the second actuator.

8. The method according to claim 7, further comprising:
determining, based on the second pilot control variable and based on the third pilot control variable, a second setpoint for influencing the driving behavior.

9. The method according to claim 1, wherein:
the first actuator steers at least one wheel of a front axle of the vehicle based on the first setpoint, or
the first actuator steers at least one wheel of a rear axle of the vehicle based on the first setpoint.

10. The method according to claim 1, wherein a device is configured to perform the method.

11. The method according to claim 1, wherein a computer program comprises computer-readable instructions which, when executed by a computer, cause the method to be performed by the computer.

* * * * *